United States Patent [19]
Chennakeshu et al.

[11] Patent Number: 6,046,990
[45] Date of Patent: *Apr. 4, 2000

[54] HIGH-PENETRATION TRANSMISSION METHOD FOR A RADIOCOMMUNICATION SYSTEM

[75] Inventors: Sandeep Chennakeshu; Nils Rydbeck; Amer A. Hassan, all of Cary, N.C.; Paul W. Dent, Stehag, Sweden

[73] Assignee: Ericsson, Inc., Research Triangle Park, N.C.

[ * ] Notice: This patent is subject to a terminal disclaimer.

[21] Appl. No.: 08/559,692

[22] Filed: Nov. 15, 1995

[51] Int. Cl.⁷ .................................................. H04B 7/212
[52] U.S. Cl. ........................... 370/317; 370/318; 455/10; 455/13.4
[58] Field of Search .................................... 370/317, 318; 455/10, 13.4, 466; 340/825.44

[56] References Cited

U.S. PATENT DOCUMENTS

| | | |
|---|---|---|
| 4,145,573 | 3/1979 | Arnold . |
| 4,301,533 | 11/1981 | Acampora et al. ........................ 455/10 |
| 4,309,764 | 1/1982 | Acampora ................................. 455/12 |
| 4,495,619 | 1/1985 | Acampora . |

(List continued on next page.)

FOREIGN PATENT DOCUMENTS

| | | |
|---|---|---|
| 0 086 541 | 8/1983 | European Pat. Off. . |
| 0 212 667 | 3/1987 | European Pat. Off. . |
| 0 360 589 | 3/1988 | European Pat. Off. . |
| 0 535 812 | 4/1993 | European Pat. Off. . |
| 0 540 808 | 5/1993 | European Pat. Off. . |
| 0 565 507 | 10/1993 | European Pat. Off. . |
| 0 632 605 | 1/1995 | European Pat. Off. . |
| 0 641 100 | 3/1995 | European Pat. Off. . |
| 0 671 824 | 9/1995 | European Pat. Off. . |
| 0 684 746 | 11/1995 | European Pat. Off. . |
| 2 418 984 | 9/1979 | France . |
| 2640756 | 3/1978 | Germany . |
| WO81/00034 | 1/1981 | WIPO . |
| 94/13113 | 11/1993 | WIPO . |
| 93/25052 | 12/1993 | WIPO . |
| 94/01943 | 1/1994 | WIPO . |
| 95/12931 | 11/1994 | WIPO . |
| 95/12936 | 5/1995 | WIPO . |
| 95/31878 | 5/1995 | WIPO . |
| 95/26112 | 8/1995 | WIPO . |
| 96/04718 | 2/1996 | WIPO . |

OTHER PUBLICATIONS

Siegman M. Redl et al., "An Introduction to GSM," Artech house, Inc. pp. 86–99, 1995.

S.A. Fechtel et al., "A New Mobile Digital Radio Transceiver Concept Using Low–Complexity Combined Equalization/Trellis Decoding and A Near–Optimal Receiver Sync Strategy", PIMRC'92, The Third IEEE International Symposium on Personal, Indoor and Mobile Ra, Oct. 1992.

B.R. Vojcic et al., "Power Control Versus Capacity of a CDMA System Operating Over a Low Earth Orbiting Satellite Link", Globecom'93, IEEE Global Telecommunications Conference (Cat No. 93CH3250-8), pp. 40–4, vol. 4, Nov. 1993.

E. Del Re et al., "The GSM Procedures in an Integrated Cellular/Satellite System", IEEE Journal on Selected Areas in Communications, vol. 13, Issue 2, pp. 421–430, Feb. 1995.

M. Luglio, "Fade Countermeasures in Ka Band: Application of Frequency Diversity to a Satellite System", Tenth International Conference on Digital Satellite Communications (Conf. Publ. No. 403), pp. 143–151, May 1995.

Primary Examiner—Melvin Marcelo
Attorney, Agent, or Firm—Burns, Doane, Swecker & Mathis, L.L.P.

[57] ABSTRACT

A method and system for increasing the signal margin of a radiocommunication link to provide a short message service which is reliable, even under non-ideal conditions. According to the method, an increase in transmission power is used in combination with bit repetition to increase signal margin without complications in the mobile unit design, significant delay, or co-channel interference. Where a more significant increase in signal margin is desired, when a longer message is required, or for voice messages, the message may be stored and the mobile unit alerted of the message.

56 Claims, 3 Drawing Sheets

U.S. PATENT DOCUMENTS

| | | |
|---|---|---|
| 4,658,436 | 4/1987 | Hill . |
| 4,679,227 | 7/1987 | Hughes-Hartogs . |
| 4,691,314 | 9/1987 | Bergins et al. . |
| 4,731,866 | 3/1988 | Muratani et al. . |
| 4,882,765 | 11/1989 | Maxwell et al. . |
| 4,905,235 | 2/1990 | Saburi ........................................ 455/10 |
| 4,910,792 | 3/1990 | Takahata et al. . |
| 4,914,651 | 4/1990 | Lusignan . |
| 4,941,144 | 7/1990 | Mizukami . |
| 5,278,833 | 1/1994 | Crisler et al. . |
| 5,295,140 | 3/1994 | Crisler et al. . |
| 5,406,593 | 4/1995 | Chennakeshu et al. . |
| 5,420,864 | 5/1995 | Dahlin et al. . |
| 5,450,395 | 9/1995 | Hostetter et al. . |
| 5,487,185 | 1/1996 | Halonen .................................. 455/127 |
| 5,563,606 | 10/1996 | Wang . |
| 5,594,776 | 1/1997 | Dent . |
| 5,633,874 | 5/1997 | Diachina et al. ....................... 370/329 |
| 5,745,523 | 4/1998 | Dent et al. . |
| 5,822,310 | 10/1998 | Chennakeshu et al. . |

HIGH-PENETRATION TRANSMISSION METHOD FOR A RADIOCOMMUNICATION SYSTEM

BACKGROUND OF THE INVENTION

The present invention generally relates to radiocommunication systems and more particularly relates to a system and method for reliably transmitting radiocommunication signals under non-ideal conditions.

Figure 1:
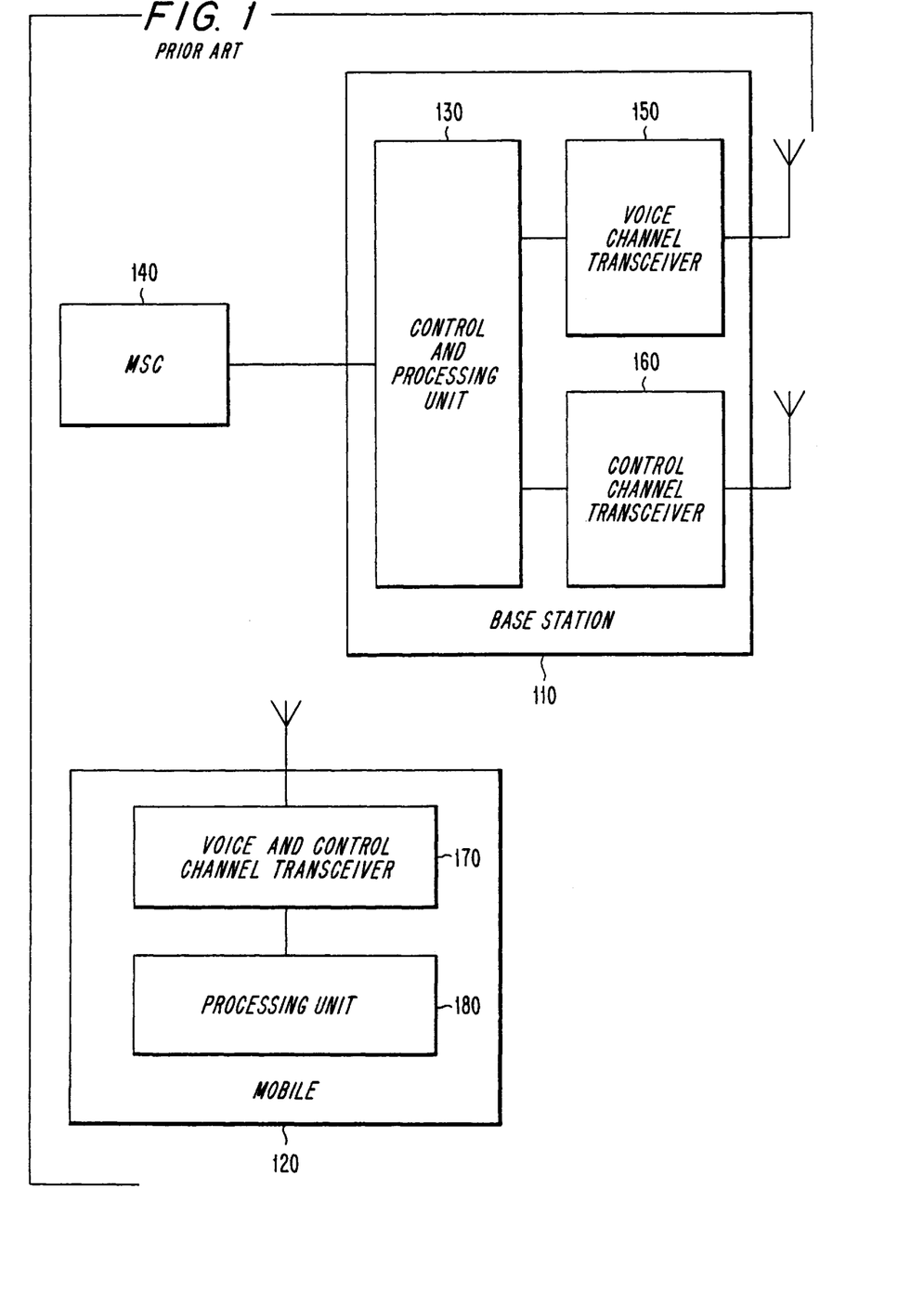
FIG. 1 is a block diagram of an exemplary mobile radiocommunication system.

Referring to FIG. 1, a typical cellular mobile radiocommunication system is shown. The typical system includes a number of base stations similar to base station 110 and a number of mobile units or stations similar to mobile 120. Voice and/or data communication can be performed using these devices or their equivalents. The base station includes a control and processing unit 130 which is connected to the MSC (mobile switching center) 140 which in turn is connected to the public switched telephone network (not shown).

The base station 110 serves a cell and includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel. The voice channel transceiver broadcasts the traffic or voice channels which can include digital control channel location information.

When the mobile 120 first enters an idle mode, it periodically scans the control channels of base stations like base station 110 for the presence of a paging burst addressed to the mobile 120. The paging burst informs mobile 120 which cell to lock on or camp to. The mobile 120 receives the absolute and relative information broadcast on a control channel at its voice and control channel transceiver 170. Then, the processing unit 180 evaluates the received control channel information which includes the characteristics of the candidate cells and determines which cell the mobile should lock to. The received control channel information not only includes absolute information concerning the cell with which it is associated, but also contains relative information concerning other cells proximate to the cell with which the control channel is associated. These adjacent cells are periodically scanned while monitoring the primary control channel to determine if there is a more suitable candidate. Additional information relating to specifics of mobile and base station implementations can be found in U.S. patent application Ser. No. 07/967,027 now U.S. Pat. No. 5,745,523 entitled "Multi-Mode Signal Processing" filed on Oct. 27, 1992 to P. Dent and B. Ekelund, the entirety of which is incorporated herein by reference. It will be appreciated that the base station may be replaced by one or more satellites in a satellite-based mobile radiocommunication system.

To increase radiocommunication system capacity, digital communication and multiple access techniques such as Frequency Division Multiple Access (FDMA), Time Division Multiple Access (TDMA), and Code Division Multiple Access (CDMA) may be used. The objective of each of these multiple access techniques is to combine signals from different sources onto a common transmission medium in such a way that, at their destinations, the different channels can be separated without mutual interference. In a FDMA system, users share the radio spectrum in the frequency domain.

Each user is allocated a part of the frequency band which is used throughout a conversation. In a TDMA system, users share the radio spectrum in the time domain. Each radio channel or carrier frequency is divided into a series of time slots, and individual users are allocated a time slot during which the user has access to the entire frequency band allocated for the system (wideband TDMA) or only a part of the band (narrowband TDMA). Each time slot contains a "burst" of information from a data source, e.g., a digitally encoded portion of a voice conversation. The time slots are grouped into successive TDMA frames having a predetermined duration. The number of time slots in each FDMA frame is related to the number of different users that can simultaneously share the radio channel. If each slot in a TDMA frame is assigned to a different user, the duration of a TDMA frame is the minimum amount of time between successive time slots assigned to the same user. In a CDIMA system, each user is assigned a unique pseudorandom user code to uniquely access the frequency time domain. Examples of CDMA techniques include spread spectrum and frequency hopping.

Figure 2:
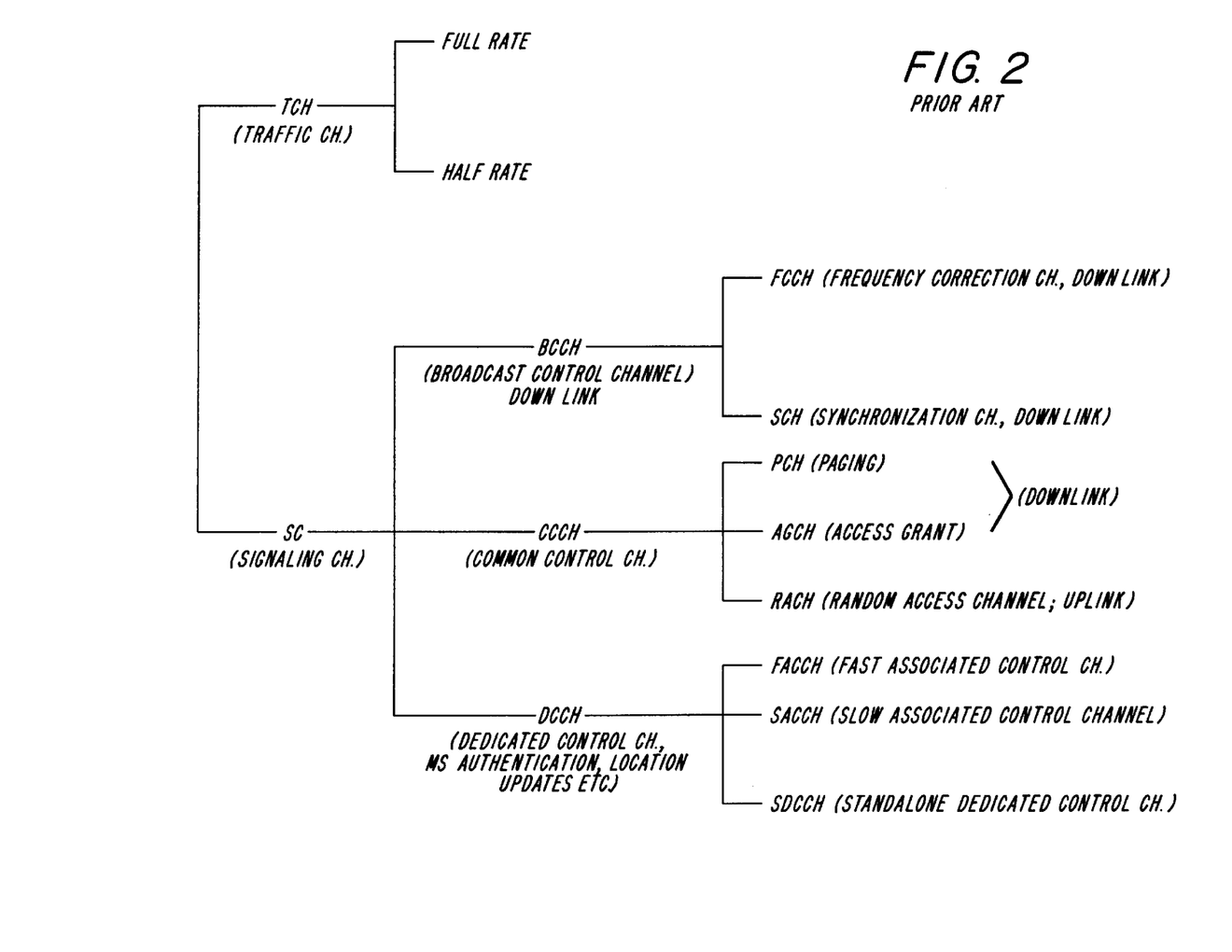
FIG. 2 is a diagram showing the organization of channels in a typical GSM digital radiocommunication system.

In a TDMA system, the successive time slots assigned to the same user, which are usually not consecutive time slots on the radio carrier, constitute the user's digital traffic channel, which is considered to be a logical channel assigned to the user. The organization of TDMA channels, using the GSM standard as an example, is shown in FIG. 2. The TDMA channels include traffic channels TCH and signalling channels SC. The TCH channels include full-rate and half-rate channels for transmitting voice and/or data signals. The signalling channels SC transfer signalling information between the mobile unit and the satellite (or base station). The signalling channels SC include three types of control channels: broadcast control channel (BCCHs), common control channels (CCCHs) shared between multiple subscribers, and dedicated control channels (DCCHs) assigned to a single subscriber. A BCCH typically includes a frequency correction channel (FCH) and a synchronization channel (SCH), both of which are downlink channels. The common control channels (CCCHs) include downlink paging (PCH) and access grant (AGCH) channels, as well as the uplink random access channel (RACH). The dedicated control channels DCCH include a fast associated control channel (FACCH), a slow associated control channel (SACCH), and a standalone dedicated control channel (SDCCH). The slow associated control channel is assigned to a traffic (voice or data) channel or to a standalone dedicated control channel (SDCCH). The SACCH channel provides power and frame adjustment and control information to the mobile unit.

The random access channel RACH is used by the mobiles to request access to the system. The RACH logical channel is a unidirectional uplink channel (from the mobile to the base station or satellite), and is shared by separate mobile units (one RACH per cell is sufficient in typical systems, even during periods of heavy use). Mobile units continuously monitor the status of the RACH channel to determine if the channel is busy or idle. If the RACH channel is idle, a mobile unit desiring access sends its mobile identification number, along with the desired telephone number, on the RACH to the base station or satellite. The MSC receives this information from the base station or satellite and assigns an idle voice channel to the mobile station, and transmits the channel identification to the mobile through the base station or satellite so that the mobile station can tune itself to the new channel. All time slots on the RACH uplink channel are used for mobile access requests, either on a contention basis or on a reserved basis. Reserved-basis access is described in U.S. patent application Ser. No. 08/140,467, now U.S. Pat. No. 5,420,864 entitled "Method of Effecting Random Access in a Mobile Radio System", which was filed on Oct. 25, 1993, and which is incorporated in this application by reference. One important feature of RACH operation is that reception of some downlink information is required, whereby mobile stations receive real-time feedback for every burst they send on the uplink. This is known as Layer 2 ARQ, or automatic repeat request, on the RACH. The downlink information preferably comprises twentytwo bits that may be thought of as another downlink sub-channel dedicated to carrying, in the downlink, Layer 2 information specific to the uplink. This flow of information, which can be called shared channel feedback, enhances the throughput capacity of the RACH so that a mobile station can quickly determine whether any burst of any access attempt has been successfully received. As shown in FIG. 2, this downlink information is transmitted on channel AGCH.

Transmission of signals in a TDMA system occurs in a buffer-and-burst, or discontinuous-transmission, mode: each mobile unit transmits or receives only during its assigned time slots in the TDMA frames on the mobile unit's assigned frequency. At full rate, for example, a mobile station might transmit during slot 1, receive during slot 2, idle during slot 3, transmit during slot 4, receive during slot 5, and idle during slot 6, and then repeat the cycle during succeeding TDMA frames. The mobile unit, which may be battery-powered, can be switched off (or "sleep") to save power during the time slots when it is neither transmitting nor receiving.

To increase mobility and portability, radiocommunication subscribers tend to prefer mobile units having a relatively small, omnidirectional (and accordingly, less powerful) antenna over mobile units having a large or directional antenna. Because of this preference, it is sometimes difficult to provide sufficient signal strength for the exchange of communication signals between typical mobile units having a small, omnidirectional antenna and a mobile switching center (MSC) or satellite. This problem is particularly serious in satellite-based mobile radiocommunications.

A satellite-based mobile radiocommunication system provides radiocommunication services to particular geographical areas of the earth using one or more partially overlapping satellite beams. Each satellite beam has a radius of up to about 1000 KM. Due to the power limitations of a satellite, it is not practical to provide a high link margin in every beam simultaneously.

Because mobile satellite links are severely power limited, communication is typically limited to line-of-sight channels with Ricean fading. Ricean fading occurs from a combination of a strong line-of-sight path and a ground-reflected wave, along with weak building-reflected waves. These channels require a communications link margin of approximately 8 dB or less to achieve voice communication in ideal or near-ideal conditions, such as when the mobile radiotelephone unit antenna is properly deployed and the unit is in an unobstructed location. In these near-ideal channels, the mobile unit can successfully monitor the paging channel to detect incoming calls. In non-ideal conditions, such as when the mobile unit antenna is not deployed or the mobile unit is in an obstructed location (e.g., inside a building) reflected waves, including ground-reflected and building-reflected waves, become dominant. The channels in these non-ideal conditions are characterized by flat Rayleigh fading (the most severe type of fading) with severe attenuation. In such channels, a link margin of as much as 30 dB or more is required to achieve voice communication, and the mobile unit may have difficulty monitoring the paging channel to detect incoming calls. In these non-ideal conditions where voice communication is made difficult, a short message service (SMS) is desirable. Due to the power limitations of the satellite, SMS is particularly effective when used in non-ideal conditions to alert a mobile station user of an incoming call. The mobile station user may then change locations to receive or return the call. The term "link margin" or "signal margin" refers to the additional power required to offer adequate service over and above the power required under ideal conditions that is, a channel having no impairments other than additive white Gaussian noise (AWGN). "Impairments" include fading of signal amplitude, doppler shifts, phase variations, signal shadowing or blockage, implementation losses, and anomalies in the antenna radiation pattern.

Whether transmitting voice or data, it is frequently desirable to increase the signal margin to ensure reliable radiocommunication performance, particularly in power-limited satellite applications. Known methods of increasing the link margin of a signal include expanding the channel bandwidth, increasing signal power, and bit repetition. Each of these methods has significant limitations. Bandwidth expansion is typically achieved by known methods such as signal spreading and low bit rate error correction coding, and results in a signal which is less sensitive to fading. Bandwidth expansion reduces spectrum allocation efficiency. Further, in a SMS application, if the expanded bandwidth of the voice channel is different from the bandwidth of the message channel, two separate and complete radios (one for each service) will be required in the mobile unit, thereby complicating its design. Also, a coherent Rake receiver or equalizer is also typically required to reduce delay spread, further complicating the design of the mobile unit. Bandwidth expansion may also be implemented by repeated transmissions of the entire voice or data message. However, under the non-ideal conditions of interest, this method is not effective because each repetition is typically below the noise floor (that is, does not have a sufficient margin), resulting in a high error rate and preventing the coherent integration of the repetitions.

Increasing signal power may also be used to provide a higher margin. Due to the power limitations of the satellite, this is typically not a practical approach. In addition to increasing the cost of the system, increased transmission power also makes it more difficult to control co-channel interference, particularly in FIDMA systems with narrow re-use margins. Accordingly, large power increases from the satellite to the mobile unit may be provided only during periods of relatively light use. Further, because the mobile unit is even more power limited than the satellite, this technique is typically practical only in one direction, from the satellite to the mobile unit.

Bit repetition may also be used to increase the margin. Bit repetition may be accomplished with a lower error rate than message repetition, particularly in non-ideal conditions. Bit repetition causes transmission delay, which is not desirable for voice signals, for obvious reasons. However, transmission delay may be acceptable for data communications, such as a SMS feature, provided that the delay is kept to a reasonable minimum. Bit repetition is achieved by transmitting individual bits or modulation symbols, or packets of bits or modulation symbols, a plurality of times such that all repetitions are contained within the same time slot or slots of successive TDMA frames. The receiver integrates the energy from each repetition to create a signal having a higher margin. As noted above, bit repetition can cause significant delay, depending upon the length of the message. To achieve a 30 dB signal margin, each bit will have to be repeated 1000 times. A typical short message has between 32 and 64 characters in the GSM system, the European digital standard, up to 245 characters in the DAMPS (Digital Advanced Mobile Phone Service IS-136) system currently used in the United States, and up to 160 characters in the DECT (Digital European Cordless Telephone) system. Assuming a GSM system having TDMA frames of 18.64 ms, with 16 slots per frame and 114 data bits/slot, the minimum delay for receiving a 64 character message, not including propagation time, is as follows:

64 bits×8 bits/character×1000 repetitions/bit×18.64 ms/slot×1/114 slot/data bit=84 seconds.

Such a delay is highly undesirable, even for data transmission. Accordingly, it would be desirable for a radiocommunication system to allow for transmission of signals at an increased signal margin without significant delay and without a significant increase in power.

It would be further desirable for a communication system to allow for transmission of signals with an increased signal margin without requiring expansion of the channel bandwidth.

It would also be desirable for a TDMA communication system to allow for transmission of signals with an increased signal margin without requiring a change in the structure or organization of TDMA frames.

It would be further desirable for a mobile radiocommunication system to allow for transmission of data messages originating from either a mobile unit or from a satellite or base station with an increased signal margin.

It would be further desirable for a communication system to selectively increase the signal margin of a communication link for the transmission of data messages.

SUMMARY OF THE INVENTION

The above-noted and other limitations of conventional communication systems and methods are overcome by the present invention, which provides for a high-penetration transmission method in which signal margin is increased by a combination of bit repetition and a relatively small increase in power. According to exemplary embodiments, the combination of bit repetition and a relatively small increase in power avoids the unacceptable delays characteristic of systems which rely solely on repetition to increase the signal margin. Likewise, the combination of repetition and a relatively small increase in power avoids the co-channel interference problems of systems which rely solely on a power increase to increase the signal margin.

According to an exemplary embodiment of the present invention, a mobile radiocommunication system is provided with a short message service feature for transmitting alphanumeric messages to and from a mobile unit. In order to ensure reliable transmission over channels having severe attenuation, the communication system, a short message is encoded with error detection coding; the message is divided into packets or groups of one or more bits each; each packet is transmitted, at a power level greater than the power level for voice transmission, multiple times over a TDMA communication channel, using the same time slot or slots for each transmission; and the transmissions are integrated and checked for errors at the receiver to form a signal having an increased margin.

BRIEF DESCRIPTION OF THE DRAWINGS

The foregoing objects, features and advantages of the present invention will be more readily understood upon reading the following detailed description in conjunction with the drawings in which.

DETAILED DESCRIPTION OF THE PREFERRED EMBODIMENTS

While the following description is directed toward a short message service implemented in a satellite-based radiocommunication system, it will be appreciated that the present invention may also be applied to other types of communication systems.

Figure 3:
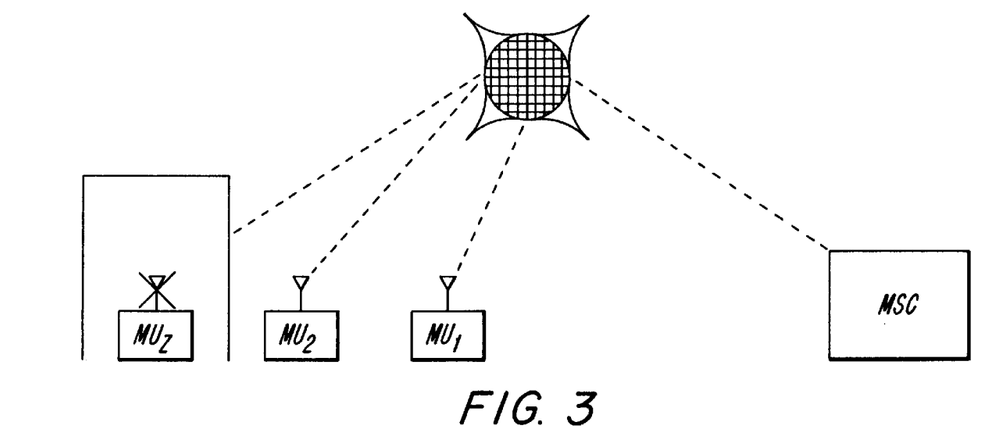
FIG. 3 is a diagram of a satellite-based mobile radiocommunication system in which the signal transmission method of the present invention may be implemented.

In a satellite-based mobile radiocommunication system, a communication link for transmitting voice or data may be established between a mobile station and either a standard telephone or a second mobile station through one satellite, multiple satellites, or a combination of one or more satellites and the PSTN (public switched telephone network). Such a system, as shown in FIG. 3, may be desirable to achieve a broad geographical coverage in which few or no base stations are present, and additional base stations are not practical, such as in rural areas. Due to the inherent power limitations of satellites, voice communications links between the satellite and the mobile station require ideal or near-ideal conditions; that is, conditions such as line-of-sight communication with the mobile station's antenna properly deployed. In non-ideal conditions, such as when the mobile station is shadowed (e.g., inside a building, etc.) or when the mobile antenna is not properly deployed, the power or signal margin requirements for communication increases significantly due to the increased attenuation in the channel. In such situations (shown as MUz in FIG. 3), Rayleigh fading often prevents satisfactory communication, and it is therefore desirable to send a short alphanumeric message to the mobile station. The message may be used, for example, to inform the subscriber of an incoming call. The present invention ensures reliable transmission of the message by providing for an efficient technique for increasing signal margin without significant delay, power increase, or co-channel interference.

For purposes of illustration only, and without limiting the scope of the invention, a satellite-based GSM radiocommunication system using TDMA channels may be assumed to exhibit the following conditions. The communication channel has no line of sight component and is subject to flat Rayleigh fading with severe attenuation. As will be appreciated by those of skill in the art, Rayleigh (or multipath) fading is a phenomenon which occurs when multipath waves form standing-wave pairs due to reflection from the physical structures in a service area. The standing-wave pairs summed together form an irregular wave fading structure. When the mobile unit is stationary, it receives a constant signal. However, when the mobile unit is moving, the fading structure causes fading to occur which increases as the mobile unit moves faster. The mean signal level of the non-ideal Rayleigh channel is approximately 20–30 dB below the signal level of a near-ideal line-of-sight channel.

In order to ensure reliable transmission of a short message to the mobile unit in non-ideal conditions, the signal margin must be increased. According to the present invention, bit repetition and power increase may be combined to provide an increased signal margin without significant delay.

It will be appreciated that decibels (dB) are units used to express ratios of power, current, or voltage. Specifically, a power ratio (P2/P1) may be expressed in decibels by the formula dB=10 log (P2/P1). A signal margin of 30 dB requires a power ratio of 1000, since 10 log 1000=30. Thus, to achieve this signal margin solely by bit repetition, each bit must be repeated 1000 times and the signal margin from each repetition must be integrated at the receiver, resulting in the 82 second delay calculated above. However, to achieve a 15 dB margin, the required power ratio is only 31.623, since 10 log 31.623=15. Thus, a 30 dB signal margin may be provided by increasing the power by 15 dB and repeating each bit approximately 31 times. Using this technique, the bit-repetition delay for a 64 character message is (64 characters×8 bits/character×31 repeats/bit×18.64 ms/slot×1/114 slot/bits) approximately 2.5 seconds. As a result, the bit repetition delay is maintained at a reasonable level, and the power increase is also maintained at a reasonable level, thereby avoiding co-channel interference. It will be appreciated that many different combinations of repetitions and power increases are possible to achieve successful communication in Rayleigh fading environments without significant delay. Further, rather than repeating individual bits of a digital signal, groups of bits may be repeated.

To implement the technique of the present invention, the power increase from the satellite to the mobile station may be provided by averaging a power load across multiple users. That is, communication channels used by mobile units in near-ideal conditions might have their power reduced to increase the power supply to a mobile unit or units in the non-ideal conditions. Power increase may also be provided by time averaging, in which individual slots in consecutive TDMA frames are transmitted at an increased power level. It will be appreciated that the power increase from the satellite to the mobile station may also be achieved by other techniques known in the art.

The power limitations of the mobile unit are even more severe than the power limitations of the satellite. Thus, it is even more difficult to increase power for communication from the mobile to the satellite. Such communication is necessary to send a message or acknowledge receipt of a message. According to one embodiment of the present invention, the power increase from the mobile unit to the satellite may be achieved by allowing the mobile unit to transmit on all time slots of the random access channel RACH. Bit repetition may also be implemented by the mobile unit to further effectively increase the margin of the signal transmitted to the satellite. Since acknowledgement by the mobile unit over the RACH channel may be accomplished by a signal having a low information rate, a higher number of sync bits and a higher number of bit and message repetitions relative to the forward channel can be used to compensate for the lower transmission power of the mobile unit. Preferably, the mobile unit transmits consecutive repetitions on separate carrier frequencies to decorrelate the repetitions. Because the message is short, the transmission time will be short and the average transmitted power will be acceptable using this system.

Figure 4:
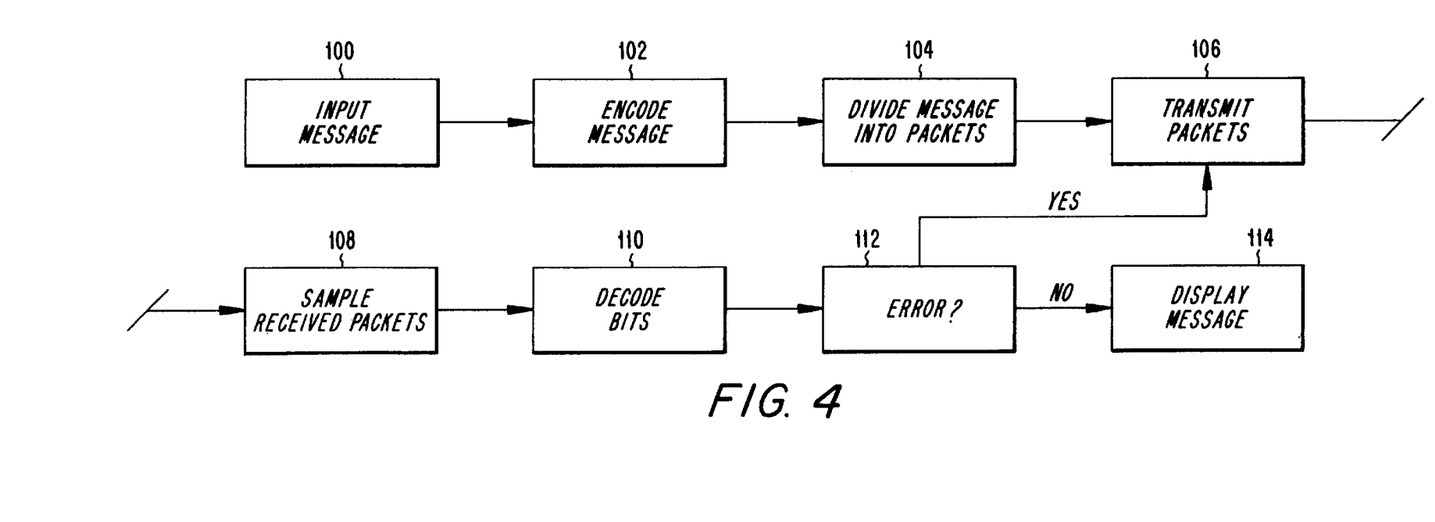
FIG. 4 is a flow chart describing the transmission of a short message according to the present invention.

Referring now to FIG. 4, a flow chart describing the transmission of a short message using the transmission method of the present invention is shown. In step 100, a sending party inputs a message to be transmitted to a receiving subscriber. The message may be input into the communication system directly by the sending party through a mobile unit, a standard telephone, a computer terminal, or equivalent device, or the message may be input indirectly by calling an operator at a service center who inputs the message into the system. In step 102, the information bits comprising the short message are encoded by an encoder located at the transmitter with an error detection code, such as CRC. The encoded message constitutes a codeword of some number X of codeword bits or symbols. It should be recognized that the transmitter may be the satellite, a base station, or a mobile unit. In step 104, each of the X codeword bits or symbols output by the encoding means are repeated N times to form a packet containing N bits. It will be apparent that, instead of repeating individual bits or symbols, groups of two or more bits or symbols could also be repeated. Packets are then transmitted such that each slot within a TDMA frame includes one or more packets of repeated bits, error detection coding bits, and a sync burst to enable the receiver to estimate the channel quality. All bits comprising the encoded short message are transmitted in this fashion. Once the entire encoded message has been transmitted, the transmission of the message (in the form of packets of N codeword bits) is repeated M times to achieve the desired signal margin. It will be appreciated that, since the short message may be transmitted from a satellite, base station, or mobile station, encoding and transmitting functions are provided in each of these devices. It will also be appreciated that, in order to implement the technique of the present invention, means are included in the transmitter to determine the number of bit repetitions N, message repetitions M, and power increase necessary to achieve the signal margin required for successful transmission of the message.

In step 108, the receiving device (i.e., the mobile unit, satellite, base station, or equivalent device) samples the received signal, including the repeated encoded message bits, error detection bits, and channel quality estimation bits, and generates a metric sum of the form $$\gamma_j = \sum_{i=1}^{N} |r_{ij} - \hat{C}_j S|^2,$$

where $r_{ij}$ is the sampled received signal corresponding to the ith repetition of the information bit or symbol S in packet repeat j, and $C_j$ is the corresponding estimate of channel quality. In step 110, a decoder contained in the receiving device decodes each encoded bit or symbol in the TDMA slot from the metric sums, using soft combining or majority logic voting, or other suitable decoding methods. To implement soft combining, the decoder adds metric sums as $$\gamma = \sum_{J=1}^{M} \gamma_j$$

and makes a bit or symbol decision based on the sum. To implement majority logic voting, the decoder makes a preliminary bit or symbol decision for each metric $y_j$ and then a makes a final bit or symbol decision by comparing all of the preliminary decisions. Thus, if the decoder has made M preliminary decisions, the decoder will determine that the corresponding information bit is a 1 if more than half of the preliminary decisions were 1; otherwise, the decoder will determine that the corresponding information bit is a 0. The same logic is used to decode a bit that is a 0. To prevent an error which might result if exactly half of the preliminary decisions are 0 and exactly half of the preliminary decisions are 1, M is chosen to be an odd number. The decoded bits are combined coherently and the multiple transmissions of the message are combined coherently to generate a message signal having an increased margin.

In step 112, an error detector contained in the receiving apparatus detects errors based on the CRC error detection coding provided at the transmitting apparatus. If no errors are detected, the message is displayed on the receiving subscriber's mobile unit in step 114. If an error is detected, then the message is not displayed at the receiving apparatus, the user is notified of an erroneous message by a displayed error message or by an audio signal, and the receiver requests the transmitter to retransmit message or the erroneous parts of the message in accordance with a bidirectional radio protocol described in more detail below.

According to the present invention, repeated transmission of messages may be used in combination with repetition of individual portions of a message. That is, individual portions of the message may be transmitted multiple times, and when the entire message has been transmitted by means of the repeated transmissions of the message portions, the entire message may be transmitted again.

According to a further aspect of the present invention, the message repetitions are decorrelated by, for example, transmitting the message or message portions on different frequencies, on different polarizations, or at appropriate time delays.

The transmission system of the present invention may further include forward error correction (FEC) means. In such an arrangement, the transmitter is provided with a second encoder for encoding the information bits of the short message with an error correction code, after encoding the information bits with an error detection code in step 102. The message is transmitted, and the received message decoded, in the manner indicated above. With majority logic voting, a hard decision decoder is employed, and the bits at the output of the majority logic voter are fed to a channel decoder with no additional information (such as bit reliability information estimated from the channel). If soft combining is used, a soft decision decoder is employed to decode the error correction code, and metric sums $y_j$ are added to the soft decision decoder output, and the sum is fed to an error correction decoder. Error correction coding will be more effective if different outputs of the error correction encoder are interleaved by separating consecutive output bits as far as possible in the transmission stream.

It will be appreciated that the higher the number of bit and message repetitions, the better the performance of the system will be, but the longer the delay will be. A TDMA slot has a finite number of bits which may be used as either sync information or data. Increasing the number of bit repeats (N) in a packet necessarily requires a reduction in the number of sync bits. The metric sum depends upon the estimated channel quality, and the channel quality depends upon the number of sync bits. If a TDMA slot has $N_t$ bits, there are $N_s$ sync bits/slot, and $N_t-N_s$ data bits per slot, then the gain in signal-to-noise ratio per bit due to repetition is approximately $(N_tN_s-N_s 2)/N_t$. The optimal gain in signal-to-noise ratio therefore occurs when $N_s=N_t/2$. However, it will be appreciated that the choice of the number of sync bits and data bits in a given slot will depend upon the particular transmission scheme to be implemented.

As described above, the link established for communicating messages between a satellite and a mobile station is a bidirectional link. Accordingly, a radio protocol may be chosen for use between the satellite and the mobile station to enhance the utility of the short message system. For example, a simple protocol may be implemented in which a mobile station receiving a message would respond to the satellite with a "YES" or "NO" to indicate whether the message was received correctly. Alternatively, a more complicated protocol can be implemented in which a packet or group of packets is identified by a group ID and protected by CRC error detection code. If the CRC indicates that the message was not received correctly, then the satellite can resend the packets comprising the erroneous group. In this manner, only packets with errors need to be retransmitted, as opposed to resending a complete message. Thus, this protocol can be used to optimize the number of repeats and thereby minimize delay and wasted satellite power.

The bidirectional link of the SMS according to the present invention also provides for advantages with respect to billing. A unidirectional link prevents a short message delivery fee to be charged to the sender or recipient because there is no evidence that the message was correctly received. Thus, a SMS service with a unidirectional link may be offered to a subscriber at an increased subscription rate. In contrast, because a bidirectional link allows a message sender or service operator to determine whether a message was correctly received, the service operator can provide a SMS service with a delivery fee for each correctly received message only.

As discussed above, for longer messages, voice communications, or conditions requiring a link margin of greater than 30–40 dB, unacceptably long delays may result in the technique of the present invention. In such cases, the message may be stored at the satellite or corresponding cellular mobile switching center (MSC). When the mobile unit is able to read the broadcast control channel (BCCH) of a more favorable communication channel, the unit may be alerted of the stored message by means of, for example, a flag on the broadcast control channel.

Using the technique of the present invention, increased signal margin may be provided without bandwidth expansion, thereby avoiding complicated mobile station design. Further, there is no change required in the TDMA frame structure or organization, other than message content. The method of the present invention allows signals to be transmitted to or from the mobile station. Since the method is bidirectional, it will be appreciated by those of ordinary skill in the art that the system can be implemented as part of a signal control channel in a TDMA system.

While the foregoing description has included many specificities, the exemplary embodiments disclosed are for illustrative purposes only, and are not limiting of the present invention. Many modifications will be readily apparent to those of ordinary skill in the art which do not depart from the spirit and scope of the invention, as defined by the appended claims and their legal equivalents.

What is claimed is:

1. A method for increasing the margin of a communications link, comprising the steps of:

establishing a communication link between a transmitter and a mobile receiver at an initial power level, the communication link having a plurality of time slots, each time slot including a plurality of information bits;

transmitting an information signal, the information signal including a message intended specifically for the mobile receiver in groups of one or more information bits from the transmitter to the mobile receiver over the communication link at an increased power level; and integrating the transmitted groups at the mobile receiver to form an information signal having an increased margin level.

2. The method of claim 1, further comprising the step of encoding each transmission with error detection coding information prior to the step of transmitting.

3. The method of claim 2, further comprising the step of decoding the information bits by soft combining prior to the step of integrating.

4. The method of claim 1, further comprising the steps of determining whether the transmission of the information signal is successful, and storing the information bits of the information signal for later transmission to the mobile receiver if the transmission of the information signal is unsuccessful.

5. The method of claim 1, wherein the transmitter is a satellite and the mobile receiver is a receiver mobile telephone unit.

6. The method of claim 1, wherein the transmitter is a mobile telephone unit and the mobile receiver is a satellite.

7. The method of claim 6, wherein the information signal is an acknowledgement signal.

8. The method of claim 7, wherein the acknowledgement signal is transmitted on the random access channel of a mobile radiocommunication link.

9. The method of claim 1, wherein the communication link is a bidirectional link.

10. The method of claim 1, wherein the communication link is a Rayleigh channel.

11. The method of claim 4, further comprising the step of notifying the mobile receiver that the information signal is being stored.

12. A communication system, comprising:
a mobile receiver; and
a transmitter for transmitting information signals at a first power level, the information signals including one or more messages intended specifically for the mobile receiver, and the transmitter including means for transmitting portions of the information signals at a second power level,
wherein the mobile receiver receives the portions and integrates the received portions to form an integrated information signal.

13. The communication system of claim 12, wherein the transmitter further includes an encoder for encoding the information signals with error detection coding, and wherein the mobile receiver includes a decoder for decoding the received portions.

14. The communication system of claim 13, wherein each portion includes one or more bits of an information signal.

15. The communication system of claim 12, wherein the transmitter is a satellite and the mobile receiver is a mobile telephone unit.

16. The communication system of claim 12, wherein the transmitter is a mobile telephone unit and the mobile receiver is a satellite.

17. The communication system of claim 16, wherein the information signals are transmitted on the random access channel of a mobile radiocommunication link.

18. The communication system of claim 13, wherein the transmitter and mobile receiver communicate to determine whether the transmission of the information signal is successful, and a storage means stores the information bits of the information signal for later transmission to the mobile receiver if the transmission of the information signal is unsuccessful.

19. The communication system of claim 18, wherein the transmitter notifies the mobile receiver that the information bits are being stored by the storage means.

20. The communication system of claim 13, wherein the portions transmitted by the transmitter are decorrelated.

21. The communication system of claim 13, wherein the transmitter further includes an error correction encoder for encoding the information signals with error correction coding, and the mobile receiver further includes an error correction decoder for decoding the received portions.

22. A method for transmitting data, comprising the steps of:
encoding data to be transmitted to a specific mobile receiver with error detection coding to form a data codeword;
dividing the data codeword into packets of one or more data bits each;
transmitting each packet a plurality of times at a first signal margin over a communication channel established between a transmitter and the mobile receiver, the communication channel carrying voice signals at a second signal margin, the second signal margin being lower than the first signal margin;
sampling the packets at the mobile receiver;
decoding the packets; and
integrating the decoded packets to form a data signal having a third signal margin, the third signal margin being higher than the first signal margin.

23. The method of claim 22, wherein the step of decoding is performed by soft combining.

24. The method of claim 22, wherein the step of decoding is performed by hard decision decoding.

25. The method of claim 22, wherein the data signal is an alphanumeric message.

26. The method of claim 22, wherein the transmitter is a satellite and the mobile receiver is a mobile telephone unit.

27. The method of claim 22, wherein the transmitter is a mobile telephone unit and the mobile receiver is a satellite.

28. The method of claim 27, wherein the data signal is an acknowledgement signal for acknowledging the receipt of a message.

29. The method of claim 28, wherein the acknowledgement signal is transmitted on the random access channel of a mobile radiocommunication system.

30. The method of claim 26, further comprising the steps of:
determining at the mobile receiver whether the alphanumeric message contains any errors;
requesting retransmission of one or more packets if the alphanumeric message contains errors; and
displaying the alphanumeric message at the mobile receiver if the alphanumeric message does not contain errors.

31. The method of claim 22, wherein the transmissions of each packet are decorrelated.

32. The method of claim 22, further comprising the step of encoding the codeword with error correction coding prior to the step of transmitting.

33. A method for establishing a communication link at a first margin level, comprising the steps of:
transmitting signaling information intended for a specific mobile receiver by the transmitter at a second margin level not equal to the first margin level; and
exchanging communication signals over the communication link between the transmitter and the mobile receiver at the first margin level based on the signaling information.

34. The method as recited in claim 33, wherein the step of transmitting further comprises the step of transmitting signaling information by the transmitter at the second margin level greater than the first margin level.

35. The method as recited in claim 34, wherein the step of transmitting further comprises the step of transmitting the signaling information at the second margin level not less than approximately 10 db greater than the first margin level.

36. The method as recited in claim 33, wherein the step of transmitting further comprises the step of encoding the signaling information with error detection coding information.

37. A method for conmmunicating between a transmitter and a mobile receiver comprising the steps of:

transmitting, to the mobile receiver, traffic information at a first margin level by the transmitter; and transmitting, to the mobile receiver, control information intended specifically for the mobile receiver at a second margin level by the transmitter, the second margin level being not equal to the first margin level.

38. The method as recited in claim 37, wherein the step of transmitting, to the mobile receiver, control information at a second margin level further comprises the step of transmitting, to the mobile receiver, control information at the second margin level greater than the first margin level.

39. The method as recited in claim 38, wherein the step of transmitting, to the mobile receiver, control information at a second margin level further comprises the step of transmitting, to the mobile receiver, control information at a second margin level not less than approximately 10 db greater than the first margin level.

40. The method as recited in claim 37, wherein the step of transmitting to the mobile receiver, control information at a second margin level further comprises the step of encoding the control information with error detection coding information.

41. The method of claim 1, wherein the system of transmitting is performed by transmitting each group a plurality of times.

42. The system of claim 12, wherein the transmitter transmits each portion a plurality of times.

43. In a cellular system including at least a base station and a mobile station, a method for establishing a communication link between said base station and said mobile station, comprising:

transmitting a normal paging burst from said base station to said mobile station at a first signal margin; and responsive to a failure by said mobile station to detect the normal paging burst, transmitting a short message service (SMS) message to said mobile station at a second signal margin higher that said first signal margin.

44. The method of claim 43, wherein a portion of said second signal margin is obtained by transmitting the SMS message at an increased transmit power.

45. The method of claim 43, wherein a portion of said second signal margin is obtained by coding the SMS message using forward error correction coding.

46. The method of claim 45, wherein a portion of said second signal margin is obtained by transmitting the SMS message at an increased transmit power and by increased coding of the SMS message.

47. The method of claim 43, wherein a portion of said second signal margin is obtained by dividing the SMS message into a plurality of packets of one or more bits, transmitting each packet a plurality of times and integrating the transmissions of each packet at the mobile station.

48. The method of claim 45, wherein the SMS message contains information alerting the mobile station to the presence of an incoming call.

49. A method of establishing a communication path between a base station and a mobile station, comprising:

transmitting a short message service (SMS) message to said mobile station from said base station at a first signal margin notifying said mobile station of an incoming call; and establishing a communication link between said base station and said mobile station at a second signal margin lower than said first signal margin.

50. A communication system comprising:

a base station for transmitting a normal paging burst at a first signal margin; and a mobile receiver for receiving the normal paging burst, wherein if said mobile receiver fails to receive said normal paging burst, said base station transmits a short message service (SMS) message to the mobile receiver at a second signal margin higher than the first signal margin.

51. The system of claim 50, wherein a portion of said second signal margin is obtained by transmitting the SMS message at an increased transmit power.

52. The system of claim 50, wherein a portion of said second signal margin is obtained by coding the SMS message using forward error correction coding.

53. The system of claim 50, wherein a portion of said second signal margin is obtained by transmitting the SMS message at an increased transmit power and by increased coding of the SMS message.

54. The system of claim 50, wherein a portion of said second signal margin is obtained by dividing the SMS message into a plurality of packets of one or more bits, transmitting each packet a plurality of times, and integrating the transmissions of each packet at the mobile station.

55. The system of claim 50, wherein the SMS message contains information alerting the mobile station to the presence of an incoming call.

56. A communication system comprising:

a base station for transmitting a short message service (SMS) message at a first signal margin; and a mobile receiver for receiving the (SMS) message notifying the mobile receiver of an incoming call, wherein a communication link is established between the mobile receiver and the base station at a second signal margin lower than said first signal margin.

* * * * *